(12) United States Patent
Xiao et al.

(10) Patent No.: US 10,452,065 B2
(45) Date of Patent: Oct. 22, 2019

(54) HUMAN-MACHINE INTERFACE (HMI) ARCHITECTURE

(71) Applicant: Baidu USA LLC, Sunnyvale, CA (US)

(72) Inventors: Xiangquan Xiao, Sunnyvale, CA (US); Lei Wang, Sunnyvale, CA (US); Jiangtao Hu, Sunnyvale, CA (US); Li Gao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 4 days.

(21) Appl. No.: 15/640,867

(22) Filed: Jul. 3, 2017

(65) Prior Publication Data

US 2019/0004510 A1    Jan. 3, 2019

(51) Int. Cl.
*G05D 1/00* (2006.01)
*H04L 29/06* (2006.01)
*H04L 29/08* (2006.01)
*G07C 5/08* (2006.01)
*G07C 5/00* (2006.01)
*G06F 3/0484* (2013.01)
*G06F 3/0482* (2013.01)

(52) U.S. Cl.
CPC ......... *G05D 1/0022* (2013.01); *G05D 1/0088* (2013.01); *G07C 5/008* (2013.01); *G07C 5/0841* (2013.01); *H04L 67/12* (2013.01); *H04L 67/42* (2013.01); *G05D 2201/0213* (2013.01); *G06F 3/0482* (2013.01); *G06F 3/04847* (2013.01)

(58) Field of Classification Search
CPC .... G05D 1/0022; G05D 1/0088; G07C 5/008; G07C 5/0841; H04L 67/12; H04L 67/42
See application file for complete search history.

(56) References Cited

U.S. PATENT DOCUMENTS

| | | | |
|---|---|---|---|
| 6,370,475 B1 * | 4/2002 | Breed | B60N 2/2863 340/436 |
| 9,434,314 B2 * | 9/2016 | DeLine | B60R 1/12 |
| 2008/0040005 A1 * | 2/2008 | Breed | B60J 10/00 701/48 |
| 2012/0047214 A1 * | 2/2012 | Daly | G06F 9/546 709/206 |

* cited by examiner

*Primary Examiner* — Behrang Badii
*Assistant Examiner* — Daniel L Greene
(74) *Attorney, Agent, or Firm* — Womble Bond Dickinson (US) LLP

(57) ABSTRACT

An autonomous driving vehicle (ADV) is operated using a human-machine interface (HMI). The web server provides the HMI to a computing device in response to an input received from the computing device. An ADV command is entered into the HMI and passed to an interface of the web server. In response to receiving the ADV command, the web server calls a remote procedure call to a proxy server in a backend server for processing by a perception and control module of the ADV. Results of the ADV command are received by the web server interface and stored in results memory with a unique identifier. The web server interface opens a socket that accesses the results memory. In response to a change in the results memory, the socket reads the results memory and provides the ADV command results to the HMI. Multiple HMIs can simultaneously communicate with the web server interface and socket.

21 Claims, 10 Drawing Sheets

HUMAN-MACHINE INTERFACE (HMI) ARCHITECTURE

TECHNICAL FIELD

Embodiments of the present invention relate generally to operating autonomous vehicles. More particularly, embodiments of the invention relate to an architecture to support a human-machine interface for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An autonomous driving vehicle (ADV) may have a fixed user interface as a part an overall computing system in the ADV. There is a difference between a user interface and a human-machine interface (HMI). The term "user interface" is often used in the context of (personal) computer systems and electronic devices where a network of equipment or computers are interlinked and the user interface is used to send queries or other data to a computer system a receive one or more results in response. A human-machine interface (HMI) is often local to one machine or piece of equipment and provides the interface between a human and the machine or piece of equipment. A human-machine interface may also monitor the machine and provide status updates to the HMI without requiring user input for each such update. ADVs of the prior art do not currently provide a web server that can provide a human-machine interface (HMI) to a computing device of the ADV and/or a computing device of a user. ADVs of the prior art also do not provide for multiple HMIs controlling and/or monitoring the ADV and its subsystems at the same time. Further, current ADVs do not provide an HMI that can record a driving session by a human driver, and playback the driving session in autonomous driving mode.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
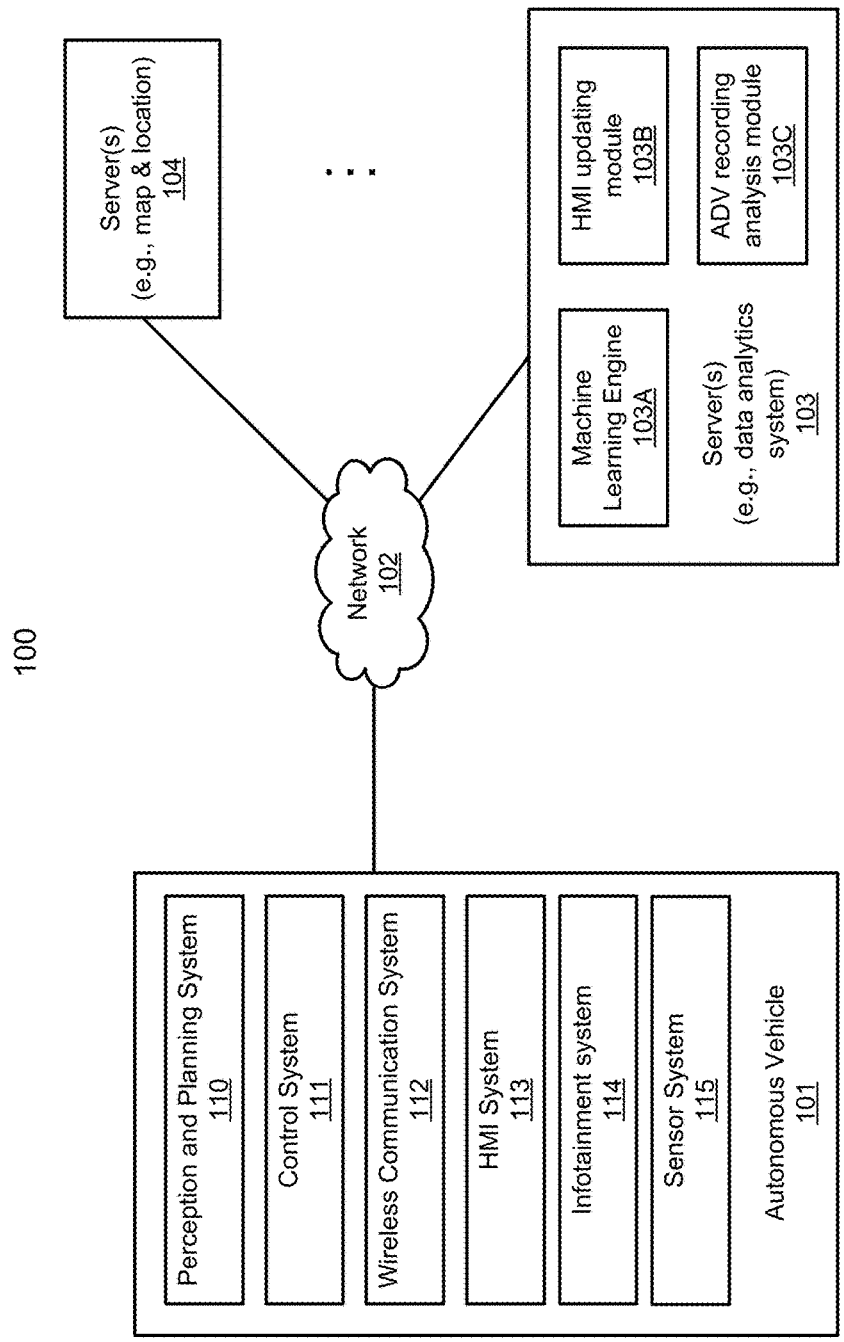
FIG. 1 is a block diagram illustrating an overview of a networked autonomous driving vehicle (ADV) system according to some embodiments.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In an embodiment, a computer-implemented method of operating an autonomous driving vehicle (ADV) using a human-machine interface (HMI) of a computing device, practiced on a web server that includes at least one hardware processor coupled to a memory programmed with executable instructions that, when executed by the at least one hardware processor, performs operations of the method that include receiving, by an interface of the web server, an ADV command from the HMI of the computing device. In response to receiving the ADV command by the web server interface, the method calls a remote procedure call (RPC) of the web server to send the ADV command via the RPC to a proxy server of a back end server of the ADV having a robotic operating system. The proxy server is configured to route the ADV command to an ADV perception and control system via a message bus. The method further includes receiving, by the web server interface, from the ADV perception and control system, a response to the ADV command and storing, by the web server interface, the ADV command response in a results memory of the web server, in association with a unique identifier of the ADV command response. A socket is opened, by the web server, that reads from the results memory at least a portion of the ADV command response that includes the unique identifier, in response to a change in the results memory. The ADV command response is provided by the socket to at least the HMI of the computing device, in response to the socket detecting a change in the results memory. Multiple HMIs from one or more computing devices can access the web server and socket to control the ADV and receive ADV command response data from the results memory via the socket. In an embodiment, in response to receiving an input from a computing device, the web server can provide the HMI for the ADV to the computing device. The HMI can comprise at least one of: a web page or an application program. The computing device can comprise a portion of an ADV computing system or the computing device can comprise a remote computing device, separate from the ADV computing system. The ADV command include one of: start, or stop, recording of an ADV driving session; playback a recorded ADV driving session; turn on, or off, a module of the ADV; or check, and return a status of, a module of the ADV. A module of the ADV comprises one or more of: a global positioning system (GPS), a control system of the ADV, a control area network (CAN) communication bus of the ADV, a localization module of the ADV, or a data recording system of the ADV. In an embodiment, the web server interface can comprise a representational state transfer (REST) interface. In an embodiment, the ADV command response can be received by the web server via an application programming interface (API) of the web server called by the ADV perception and control system of the robotic operating system (ROS). In an embodiment, the unique identifier of the ADV response comprises one or more of: a hash of the ADV command response, a checksum of the ADV command response, or a unique identifier associated with the ADV command response generated by the ADV perception and control module. In an embodiment, the method can further include reading, by the socket, the unique identifier of the ADV command response, and determining that the unique identifier associated with the ADV command response has changed.

In another embodiment, a front end of an ADV driving system can include a web server having a hypertext markup language (HTML) front end that can provide a human-machine interface (HMI) to a requesting computing device. The HTML interface can access a plurality of stored web pages and provide the plurality of web pages to a requesting computing device. One or more of the web pages can comprise an HMI. The web server can further include a representational state transfer (RESTful) interface that can receive commands from one or more HMIs associated with one or more computing devices. The HMIs can be used to control operation of the ADV. The web server can support remote procedure calls to a back end server that implements ADV commands and can return to the web server status of the ADV, responses to ADV commands, and status of the ADV with a response to an ADV command. An ADV command received from an HMI by the RESTful interface (web server interface) can be passed via remote procedure call (RPC) from the web server to a back end server of the ADV. A response to the ADV command can be returned from an ADV perception and control system of the back server to the front end web server. In an embodiment, the ADV perception and control system can call an application programming interface (API) of the web server to pass the ADV command response to the web server. The web server can store the ADV command response in a results memory of the web server that is accessible by a socket on the web server. The socket can read the results memory and publish the results of the ADV command response to one or more HMIs that access the socket.

The above method functionality can be implemented on a processing device that includes at least one hardware processor and a memory programmed with executable instructions that, when executed, implement operations of the method functionality. The executable instructions can be stored on one or more non-transitory computer-readable media. The processing system can read the executable instructions from the one or more non-transitory computer-readable media, into a memory coupled to the processing system, to execute the instructions and implement the claimed method functionality.

In another embodiment, a back end processing system of an ADV can include a proxy server that receives ADV commands from the web server via remote procedure call (RPC). The proxy server can pass a received ADV command, over a message bus, to the ADV perception and control system for processing by the ADV perception and control system. In an embodiment, the message bus can be a controller area network (CAN) bus. The back end processing system of the ADV can comprise a robotic operating system (ROS) that implements and manages various control systems and hardware within the ADV.

FIG. 1 is a block diagram illustrating an overview of a networked autonomous driving vehicle (ADV) system 100 according to one embodiment of the invention. Referring to FIG. 1, networked ADV system 100 includes autonomous vehicle 101 that may be communicatively coupled to one or more servers 103-104 over a network 102. Although there is one autonomous vehicle 101 shown, multiple autonomous vehicles can be coupled to each other and/or coupled to servers 103-104 over network 102. Network 102 may be any type of network such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc. An example server system is described below with reference to FIG. 9.

An autonomous vehicle 101 refers to a vehicle that can be configured in an autonomous mode in which the vehicle navigates through an environment with little or no control input from a driver. Such an autonomous vehicle 101 can include a sensor system 115 having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode. In an embodiment, autonomous vehicle 101 can record a driving session with the autonomous vehicle 101 driven by a human driver, and playback the driving session in full autonomous, or partial autonomous, mode. Recordings of driving sessions, whether fully autonomous, partially autonomous, or by human driver, can be uploaded to ADV recording analysis module 103.

Server 103 can include a data analytics system that includes a machine learning engine 103A, a human-machine interface (HMI) updating module 103B, and ADV recording analysis module 103C. Each such module can be implemented in software, hardware, or a combination thereof. In an embodiment, modules 103A, 103B, and 103C comprise at least one hardware processor.

HMI updating module 103B can update one or more human-machine interfaces (HMIs) on one or more ADVs 101 via network 102. Updating an HMI can include downloading, to an ADV 101, one or more web pages that serve as an HMI used by human-machine interface (HMI) system 113. Updating an HMI can include downloading, to an ADV 101, one or more application programs that implement an HMI either on ADV computing hardware. In an embodiment, HMI system 113 can make the HMI application(s) available to one or more user computing devices.

In an embodiment, ADV recording analysis module 103C can use machine learning engine 103A to compare human driving sessions to corresponding autonomous driving sessions. Machine learning engine 103A can train on differences between human driving sessions and corresponding autonomous driving sessions to improve automated driving logic.

In one embodiment, autonomous vehicle 101 includes, but is not limited to, perception and planning system 110, vehicle control system 111, wireless communication system 112, HMI system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102, or user devices that may implement a human-machine interface that can operate autonomous vehicle 101. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc.

User interface system 113 may be part of peripheral devices implemented within autonomous vehicle 101 including, for example, a keyword, a touch screen display device, a microphone, and a speaker, etc. In an embodiment, user interface system 113 can comprise a web server and a human-machine interface (HMI) that acts as a front end to a computing system of the ADV. A back end of the computing system of the ADV can include subsystems that implement driving commands, monitoring, and control functionality, such as peripheral and planning system 110, control system 111, wireless communication system 112, and sensor system 115. In an embodiment, the web server of HMI system 113 can be implemented as a portion of an onboard computing system of the ADV. In an embodiment, HMI system 113 can be implemented as a web page or application on a user computing device separate from an ADV computing system.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111. In an embodiment, a planning portion of the perception and planning module 110 can be turned off. In an embodiment, control system 111 can be turned off. The autonomous vehicle 101 can then be driven by a human driver while the planning and control modules are turned off.

In operation, a user as a passenger may specify a starting location and a destination of a trip, for example, via a HMI system 113. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive autonomous vehicle 101, for example, via control system 111, according to the planned route, to reach the specified destination safely and efficiently.

In an autonomous vehicle 101, there may be no actual or physical window. Rather, a "window" (referred to herein as a virtual window) may be represented or replaced by a display device, i.e., a flat or curved screen display device molded into a shape of a vehicle window, optionally with a touch screen. In an embodiment, the display device can comprise a portion of HMI system 113. The display device would display images or stream of images (e.g., video) that are captured dynamically in real-time by an appropriate camera or cameras, as if the user were watching or viewing the actual physical content through a see-through window. For each of the "windows" (e.g., display devices), there can be a corresponding display channel to stream the corresponding content to be displayed at real-time, which may be centrally processed by an augmenting reality system, e.g., a data processing system. In such situation, an augmented image is displayed in a virtual reality manner via infotainment system 114, also referred to as an augmented reality manner.

In embodiments described herein, outputs from each sensor in the sensor system 115 can be logged while the autonomous vehicle 101 is driven in manual (human driver), partially autonomous, or autonomous mode. Inputs to components of the control system 111 can be provided by the perception and planning module 110.

Figure 2:
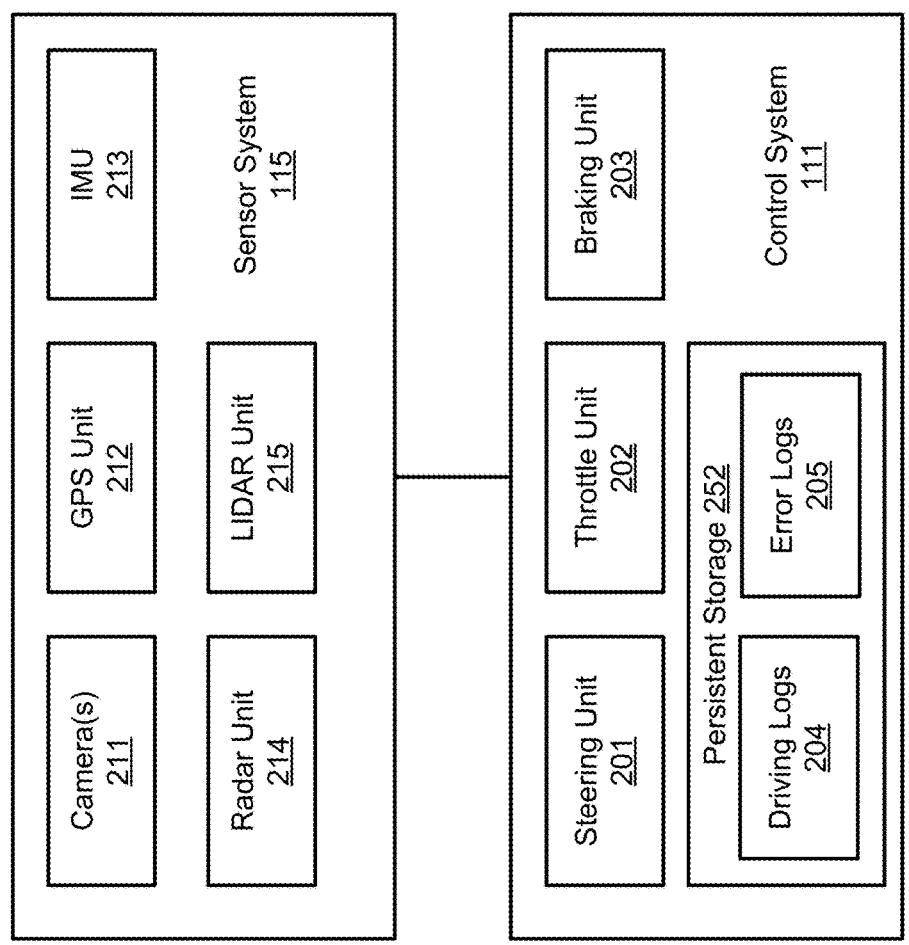
FIG. 2 is a block diagram illustrating an example of an ADV sensor and control module, according to some embodiments.

FIG. 2 is a block diagram illustrating an example of an ADV sensor and control module 200, according to one embodiment of the invention.

Referring to FIG. 2, in one embodiment, sensor system 115 can include, but it is not limited to, one or more cameras 211, global positioning system (GPS) unit 212, inertial measurement unit (IMU) 213, radar unit 214, and a light detection and range (LIDAR) unit 215. One or more of sensor system 115 components can be initialized, tested, and/or powered on/off via user interface system 113. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as a sonar sensor, an infrared sensor, a steering sensor, a throttle sensor, a braking sensor, and an audio sensor (e.g., microphone). An audio sensor may be configured to capture sound from the environment surrounding the autonomous vehicle 101. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor. Sensor system 115 may further include one or more horizontal measurement sensors. For example, a first horizontal measurement sensor may indicate whether the ADV is facing downhill, or uphill, and if so, a measurement of the forward/rearward tilt, e.g. in degrees or other angular measure. A second horizontal measurement sensor may measure lateral tilt, such as whether the ADV is tilted left or right.

In one embodiment, vehicle control system 111 can include, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof. Vehicle control system 111 can further include a persistent storage 252. Persistent storage 252 can be a ROM, RAM, battery backed RAM, solid state storage device, hard disk, CD-ROM, DVD-ROM or other persistent storage. Persistent storage 252 can include driving log database 204, error logs database 205, and executable program instructions, stored in the persistent storage 252, that when executed by, e.g., a hardware processor can execute the program instructions to implement a state analysis module 205. Driving logs 204 can include recordings of driving sessions, including driving sessions with a human driver, partially autonomous driving sessions with a human driver, and fully autonomous driving sessions. Error logs 205 can include faults, out of tolerance conditions, human overrides of machine decisions, subsystem errors, and other information related to ADV operation.

Figure 3:
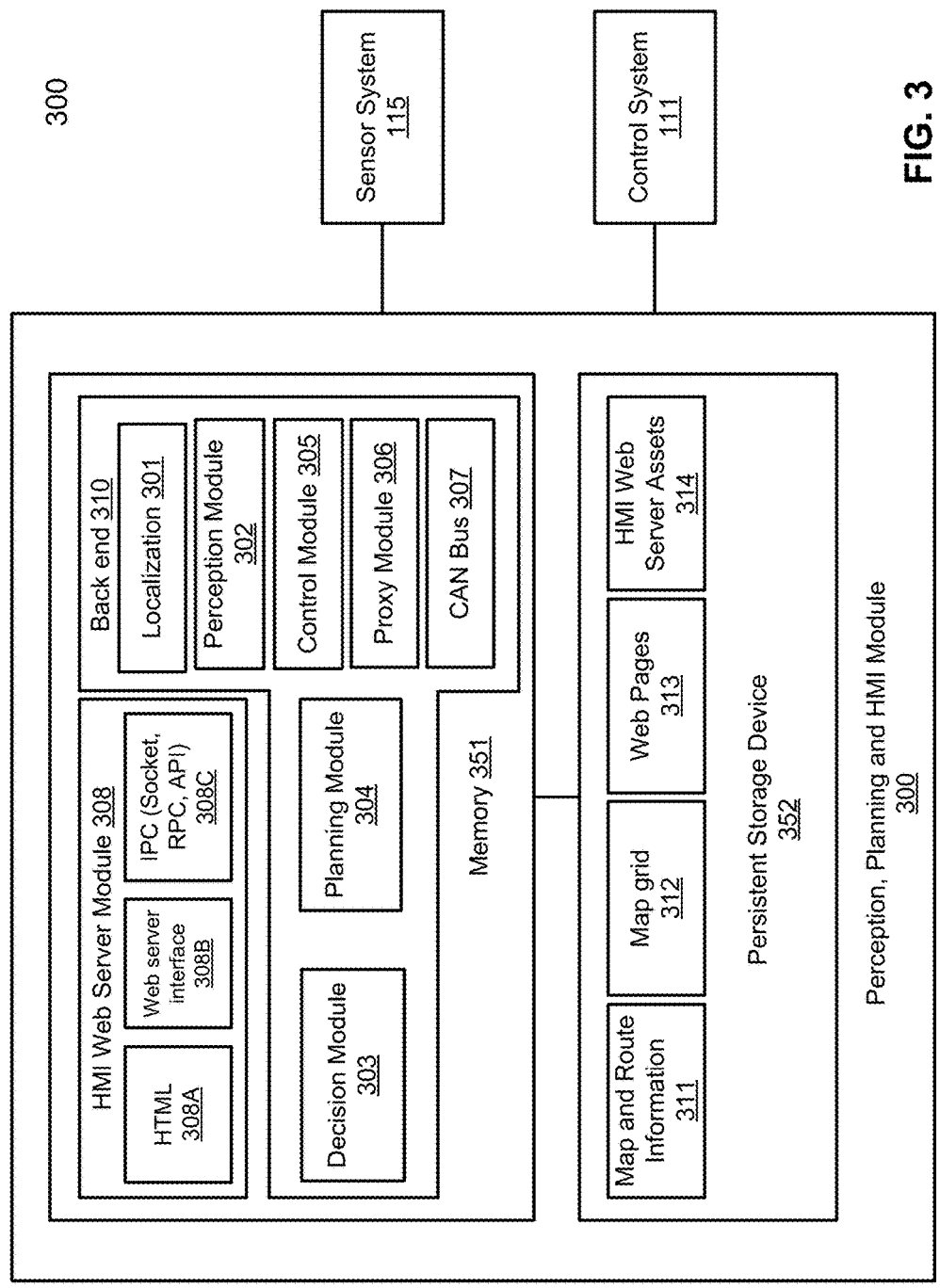
FIG. 3 is a block diagram illustrating an example of an ADV perception, planning, and HMI system, according to some embodiments.

FIG. 3 is a block diagram illustrating an example of an ADV perception, planning, and HMI system 300, according to one embodiment of the invention. System 300 may be implemented as a part of autonomous vehicle 101 of FIG. 1. Referring to FIG. 3, system 300 can include a front end that comprises a user interface web server module 308 ("front end") and back end processing 310. Back end processing 310 can include, but is not limited to, localization module 301, perception module 302, decision module 303, planning module 304, control module 305, proxy module 306, and control area network (CAN) 307. System 300 can be communicatively coupled to sensor system 115 and control system 111. System 300 can include one or more hardware processors (not shown), one or more communication modules (not shown), memory 351 and persistent storage 352, all interconnected via a communication system 307. The communication system 307 can include a controller area network (CAN) message bus, a network, interprocess communication system, or other communication system. Modules 301-308 and 310 can be implemented by instructions stored in persistent storage, read into memory 351, and executed by at least one hardware processor of perception and planning module 110.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-306 may be integrated together as an integrated module.

HMI web server module 308 can include HTML server 308A, web server interface 308B, and interprocess communication module 308C. HMI web server module 308 can comprise a "front end" that implements human-machine interface (HMI) functionality while "back end" 310 comprises a robotic operating system (ROS) with modules that implement ADV driving functionality. HTML server 308A can receive an input from a computing device and, in response to the user input, provide a human-machine interface (HMI) to the computing device. In an embodiment, the HMI can comprise one or more web pages. In an embodiment, the HMI can include one or more application programs or modules. In an embodiment, the computing device can form a part of a computing system of ADV 101. In an embodiment, the computing device can be a user computing device such as a laptop computer, a tablet computer, a Smart Phone or other user device. Hardware of a typical computing system is described below with reference to FIG. 9.

Web server interface 308B can receive one more ADV commands from the HMI. In an embodiment, an ADV command can be one or more of: start, or stop, recording of an ADV driving session; playback a recorded ADV driving session; turn on, or off, a module of the ADV; or check, and return a status, of a module of the ADV. A module of the ADV can comprise one or more a global positioning system (GPS), a control system of the ADV, a control area network (CAN) communication bus of the ADV, a localization module of the ADV, or a data recording system of the ADV. Web server interface 301B can call a remote procedure call (RPC) to pass an ADV command received from an HMI to a proxy module 306 of the back end computing system 310 of the ADV 101. Web server interface 308B can also receive and store a response to the ADV command in a results memory.

In an embodiment, web server interface 308B can include an application programming interface (API) that is called by perception and control system of the ADV back end computing system 310 to return a response to an ADV command. Web server interface 308B can cause IPC module 308C to open a socket with which to monitor the results memory for a change the results memory, indicating that updated ADV command response and/or ADV status information has been stored in results memory. Changes results memory can be published to one or more HMIs connected to the socket. Results memory can form a portion of memory 351.

Interprocess communication (IPC) module 308C can implement remote procedure call services for the web server interface 310B to pass an ADV command received from the HMI to the back end proxy module 306. IPC module 308C can also implement the API that can be called by the back end 310 to pass the response to the ADV command to the web server interface 308B. IPC module 308C can further implement socket services to monitor a results memory and publish a response to the ADV command to an HMI, in response to the results memory changing (new ADV command response received and stored).

Back end computing system 310 can include localization module 301, perception module 302, decision module 303, planning module 304, control module 305, proxy module 306, and CAN bus 307.

An object of the localization module 301 is to determine with high accuracy a location of the ADV. ADV location can be approximately determined using, e.g. GPS. The GPS coordinate can be used to obtain a high definition (HD) map with a center at the GPS location and having an HD map feature space of cells of approximately 100 meters×100 meters. The ADV onboard sensors 115 can be read and processed by the perception module 302. Perception module 302 can also generate an ADV feature space of cells of approximately 100 meters×100 meters surrounding the ADV. To determine the actual location of the ADV with respect to the HD map grid 312, localization module 301 can find a best match of a candidate cell in a candidate portion of the ADV feature space to the HD map. The match determines an offset of the ADV from the GPS-centered HD map feature space. This offset can be used, in conjunction with the HD map feature space, to determine the actual high accuracy location of the ADV.

Localization module 301 can obtain a 3D point cloud of sensor data from the sensors in perception module 302. The 3D point cloud represents sensor data surrounding the ADV 101. Localization module 301 can analyze the 3D point cloud and generate an ADV feature space of cells of data, each representing an area of approximately 10 cm×10 cm surrounding the ADV, and determine which of the cells in the 10 cm×10 cm surrounding the ADV corresponds most closely with a coordinate of the high resolution map grid 312. Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects detected by perception module 302, decision module 303 can make a decision regarding how to handle the object. For example, for a particular object (e.g., another vehicle in a crossing route) as well as its metadata describing the object (e.g., a speed, direction, turning angle), decision module 303 can decide how to encounter the object (e.g., overtake, yield, stop, pass). Decision module 303 may make such decisions according to a set of rules such as traffic rules, which may be stored in persistent storage device 352 (not shown).

Based on a decision for each of the objects perceived, planning module 304 plans a path or route for the autonomous vehicle 101, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and steering commands) at different points in time along the path or route.

Note that decision module 303 and planning module 304 may be implemented as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Persistent storage device 352 can include map and route information 311, map grid 312, web pages 313, and HMI web server assets 314. Map and route information 311 can be used to determine a sequence of navigation operations to arrive and a destination. Navigation operations can be expressed as arcs in a graph with weights and attributes that characterize the route, such as speed, traffic, signals, road type, etc. Map grid 312 can be a complete map grid of all known HD map grid feature space within a certain driving locality, such as "within the U.S." or "within California" or "within San Francisco." In an embodiment, map grid 312 can be downloaded as needed from a server, e.g. server 103 or 104, for a radius around the ADV, such as a 100 mile radius. Web pages 313 can form a part of an embodiment of a human-machine interface (HMI) with which a user can operate the ADV. In an embodiment, HMI web server assets 314 can include one or more application program modules that form a part of an HMI. In response to a request from a computing device, one or more of web pages 313 and/or HMI web server assets 314 can be returned to requesting computing device and form an HMI for operating the ADV 101 using the computing device. The HMI can be used to generate commands to operating the ADV 101.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
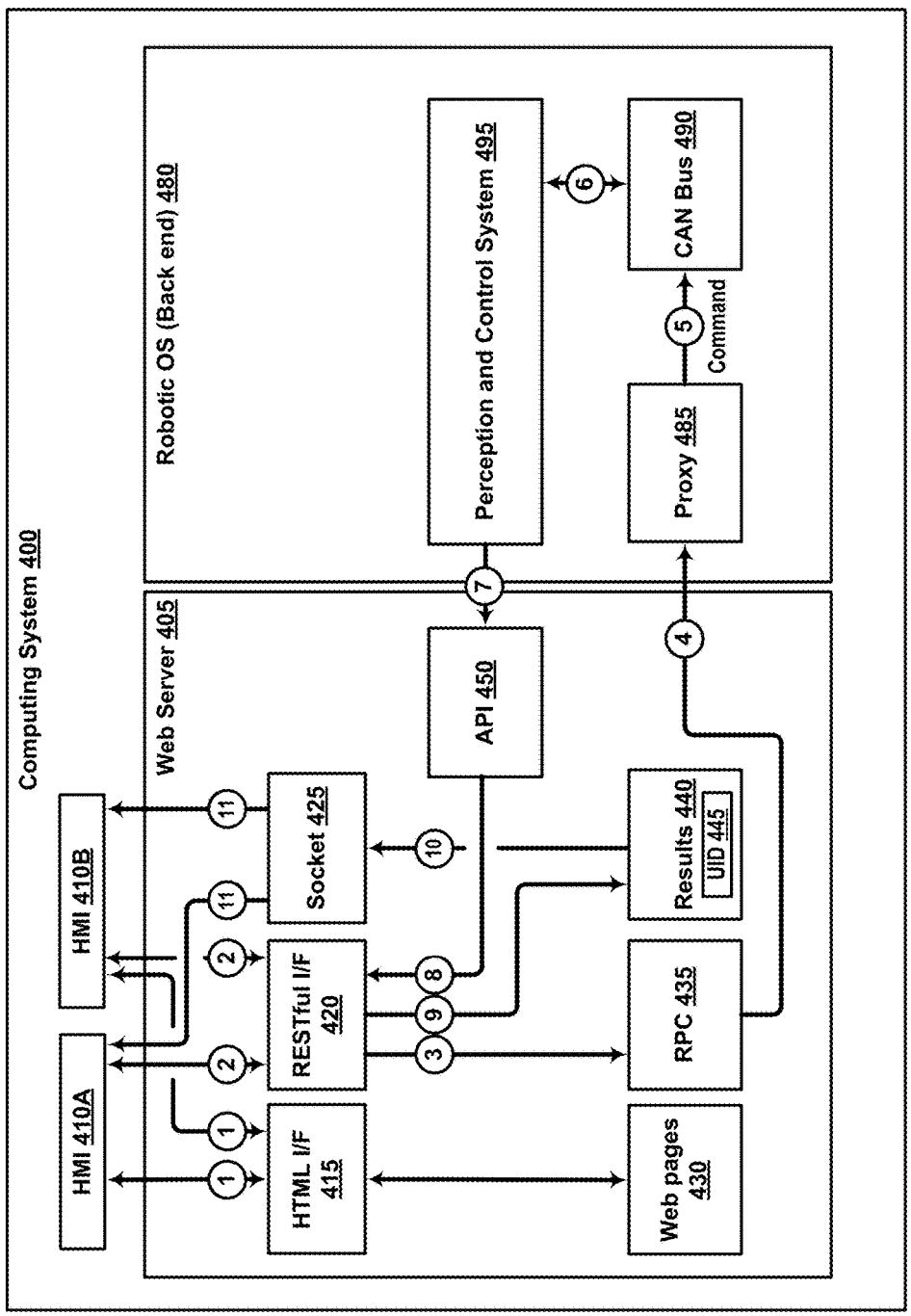
FIG. 4 illustrates controlling an ADV using a human-machine interface, a web server front end, and a robotic operating system (ROS) back end, according to some embodiments.

FIG. 4 illustrates computing system 400 for controlling an ADV using one or more human-machine interfaces (HMIs) 410, a web server front end 405, and a back end server 480 having a robotic operating system (ROS), according to some embodiments. Computing system 400 can include an ADV onboard computing system. An HMI 410 can be implemented in an ADV onboard computing system. An HMI 410 can also be implemented in a user computing system, such as a laptop computer, tablet computer, or Smart Phone. Thus, computing system 400 can comprise one or more computing devices which can include the onboard ADV computing system and one or more user computing devices.

A web server 405 can include an HTML interface 415, a representational state transfer (RESTful) interface 420, and one or more socket interfaces 425 that can each communicate with HMIs clients, e.g. client applications 410A and 410B. These interfaces can be implemented in a variety of modules, which may be implemented in software, hardware, or a combination thereof. Some of these modules can be integrated into fewer integrated modules. A computing device can send an input (1) to HTML interface 415. In response to the input, HTML interface 415 can return (1) one or more web pages 430 that can be used by the computing device to implement an HMI 410.

In an embodiment, HTML interface 415 can additionally, or alternatively, return (1) one or more application program modules that comprise at least a portion of an HMI. In an embodiment, the HTML interface 415 can return (1) one or more first web pages and/or first application program modules in response to a first input (1) from a computing device. In response to a subsequent user input (1), HTML interface 415 can return (1) one or more additional web pages and/or application program modules. In an embodiment, the subsequent input (1) can be a command entered into the first, or a previous, web page or application program module.

After a requesting computing device receives and implements at least a first HMI display screen, a user of the HMI 410 can enter one or more ADV commands (2) into the HMI 410. RESTful interface 420 can receive (2) an ADV command from HMI clients 410, e.g. HMI 410A or HMI 410B. In an embodiment, RESTful interface 420 may acknowledge (2) and ADV command received (2) from HMI 410. An ADV command can be, e.g., start, or stop, recording of an ADV driving session; playback a recorded ADV driving session; turn on, or off, a module of the ADV; or check, and return a status, of a module of the ADV. A module of the ADV can be, e.g., one or more a global positioning system (GPS), a control system of the ADV, a control area network (CAN) communication bus of the ADV, a localization module of the ADV, a data recording system of the ADV, or a combination of these. In response to receiving the ADV command, RESTful interface 420 can make one or more remote procedure calls (3) (RPC) 435 to pass the ADV command (4) to a proxy server 485 in ADV computing system back end 480.

ADV back end server 480 can include a robotic operating system (OS), proxy server 485, a messaging bus 490, and a perception and control system 495. In an embodiment, back end 480 server can be implemented on a same, or a different, computing system as front end web server 405. In an embodiment, messaging bus 490 can be a controller area network (CAN) messaging bus. Perception and control module 495 can include one or more of the components of back end 310, described with reference to FIG. 3, above. Perception and control module 495 can implement ADV driving commands, return status of ADV subsystems, and status of ADV driving commands. Proxy server 485 can pass (5) the ADV command to a message bus 490. In an embodiment, the message bus 490 can be a CAN message bus. Message bus 490 can pass (6) the ADV command to the perception and control system 495 for processing and execution.

Perception and control system 495 can return (7) a status of one or more ADV subsystems and status of completion of an ADV command, to web server 405. In an embodiment, perception and control system 495 can call application programming interface (API) 450 to return (8) such statuses to RESTful interface 420. RESTful interface 420 can store (9) status information returned from perception and control system 495 in results memory 440 along with a unique identifier (UID) 445 associated with the stored status information. In an embodiment, the UID can be generated by the perception and control system 495. In an embodiment, UID 445 can be one of a hash of the stored status information or a checksum of the stored status information. RESTful interface 420 can cause a socket 425 to be generated that monitors results memory 440. Alternatively, socket interface 425 is executed when the system initially started.

In an embodiment, results memory 440 can be associated with a particular a driving session. HMI 410A and/or HMI 410B can connect to socket 425 for the driving session. For example, at the beginning of the driving session, when clients 410A-410B are launched, socket interface 425 creates a socket connection with each of the clients 410A-410B and maintains the socket connection throughout the driving session. Socket 425 can monitor results 440 to determine whether results memory 440 has changed, such as when new status information has been stored (9) by RESTful interface 420. Alternatively, socket interface 425 may directly receive data from web server 405 or from the perception and control system via the API.

In response to a change in results memory 440, socket 425 can read (10) results memory 440. In an embodiment, socket 425 can monitor UID 445 to determine whether UID 445 has changed, indicating that results memory 440 has changed. Socket 425 can pass (11) the stored status information read (10) from results memory 440 to HMI 410A and/or HMI 410B to update the human-machine interface(s) 410A and/or 410B. In one embodiment, socket interface 425 transmits the result to clients 410A-410B substantially concurrently. In one embodiment, socket interface 425 may multicast the results to clients 410A-410B via their respective socket connections.

Figure 5A:
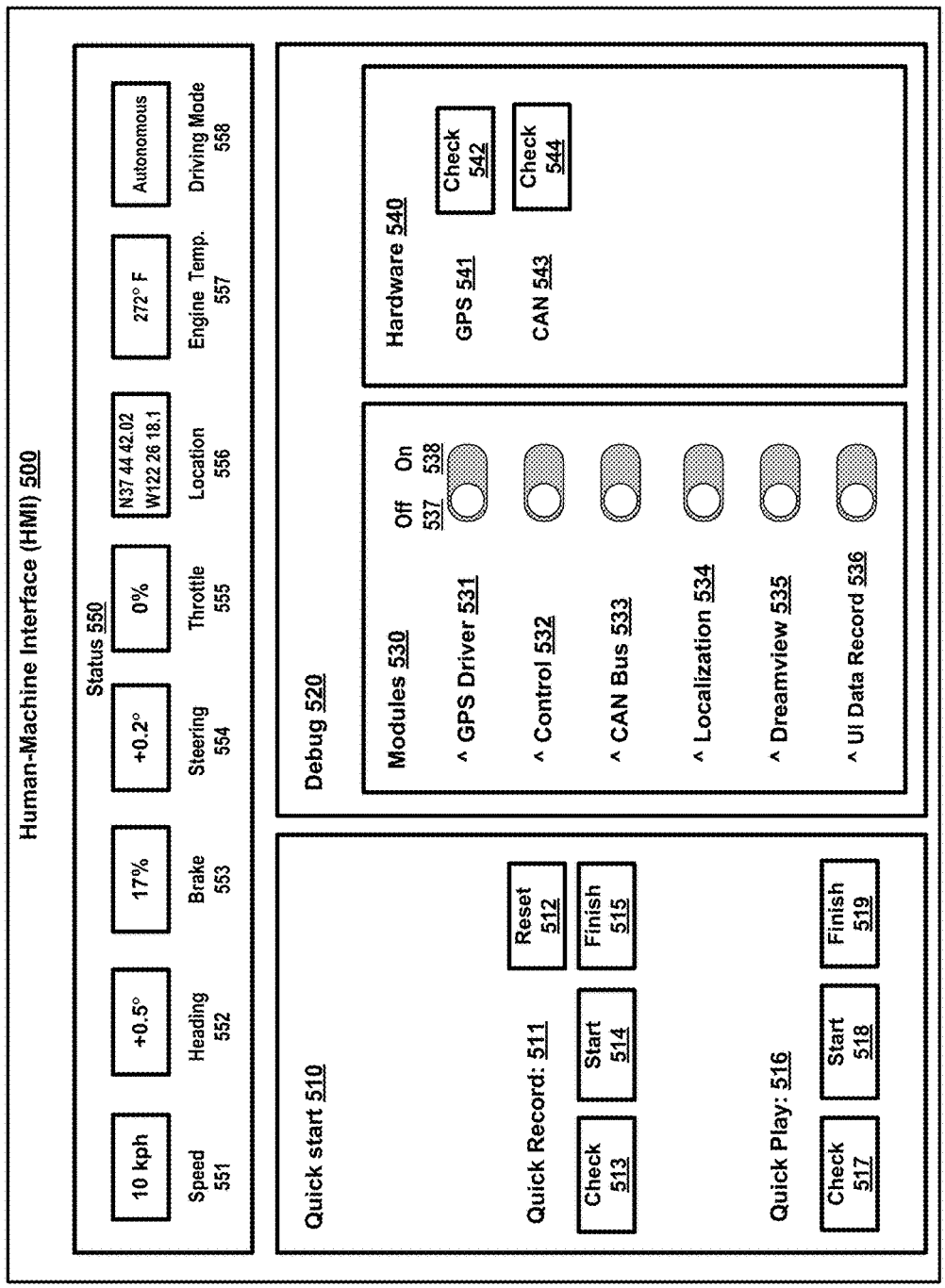
FIG. 5A illustrates an example human-machine interface for operating an ADV according to some embodiments.

FIG. 5A illustrates an example of a human-machine interface (HMI) 500 for operating an ADV 101 according to some embodiments. HMI 500 can be used to operate ADV 101. HMI 500 can include a quick start interface 510, a debug interface 520, and a status interface 550.

Quick start interface 510 can include a recording section 511 and a playback section 516. Recording section 511 can be used to initiate recording of a driving session in a manual mode (human driver), a semi-autonomous mode, or autonomous mode. HMI 500 can record sensor and control information during the recording session at regular intervals. For example, recording session can record throttle input, brake input, steering input, speed, direction, forward/backward tilt, lateral tilt, acceleration, and location, of the ADV status information at increments of time. A recording session can start at time $t_0$ can record ADV status at each next vehicle state $t+\Delta t$ for some time increment, $\Delta$. A recording session log can initially be reset using reset 512 button. Prior to beginning the driving session, and recording, a check button 513 can be pressed to check whether all ADV subsystems are online and functioning properly. To start a recording session, the driver (or passenger, collectively "driver") can press start 514. To end recording of a driving session, the driver can press finish 515.

Quick play interface 516 can use the session log from a previous driving session to automatically drive the ADV 101 in accordance with the session log. Before the ADV driving session is started, a driver can press check 517 to check whether all ADV subsystems are online and functioning properly. A driver can press start 518 to start driving the ADV in self-driving mode in accordance with the previous driving session log. In an embodiment, the driver can press 519 when the session is completed, or before the session is completed, to stop the ADV self-driving operation.

Debug interface 520 can include controls for modules of the ADV perception and control system 495 and hardware controls 540. Debug interface 530 can have controls for, e.g., a GPS driver module 531, control module 532, CAN message bus 533, localization module 534, dreamview 535, and user interface recording logs 536. Dreamview is a 3D version of the HMI. Each module can have an off/on control 537/538. Each module can also have a submenu control, "^" whose operation is described in FIG. 5B, below. Using the off/on controls 537/538, a user of the HMI 500 can generate an ADV command, e.g., an ADV command to turn ON 538 the CAN bus 533. As described with reference to FIG. 4, above, the ADV command can be received by the RESTful interface 420, passed by RPC to proxy 485, then to CAN bus 490. If CAN bus 490 is not operational, proxy server 485 can notify perception and control system 495 via interprocess communication, that the CAN bus 490 was not successfully enabled. The result of the ADV command to enable the CAN bus can be returned to RESTful interface 420, stored in results memory 440, read by socket 425, and passed to HMI 410A and/or HMI 410B (here, HMI 500) to update the HMI(s) 500 to indicate that the CAN bus 490 is not enabled. In an embodiment, the HMI 500, CAN bus 533 module can be set to the Off 537 position in response to the user setting the CAN bus 533 control On 538, and the CAN bus not 490 turning on.

Debug interface 520 can also include human interface elements for hardware 540 for checking, e.g. GPS 541 and CAN 543. GPS 541 can have a check 542 button. CAN bus hardware 543 can have a check 544 button. Clicking, e.g. Check 542 sends and ADV command to RESTful interface 420 to perform initialization and test procedures on the GPS hardware 541. If the GPS 541 fails one or more tests, specific tests, and associated successes and failures can be written to a hardware test log. If the tests are all successful, GPS 541 may have a "✓" next to it, indicating that the GPS 541 tests all passed. If one of more GPS 541 tests failed, then GPS 541 may have a "☒" next to it, indicating that one or more tests failed. The test log can be consulted to determine the exact tests, successes, and failures. Similarly, CAN message bus hardware 543 can have a check 544 that performs initialization and test procedures on the CAN message bus 543.

Status interface 550 can display ADV status information to a user of the ADV 101. In an embodiment, status interface 550 can be updated in response to an ADV command being processed by perception and control system 495. In an embodiment, status interface 550 can be updated continuously as a driving session proceeds. In an embodiment, status interface 550 updating can stop when a user selects Finish 515 or Finish 519 from Quick Start 510. Status information can include speed of the ADV 551, heading of the ADV 552, brake input 553, steering input 554, throttle input 555, location 556, engine temperature 557, and driving mode 558. In an embodiment, driving mode 558 can be manual (human driver), semi-autonomous, or autonomous. Driving mode 558 can be determined from selection of Quick Record 511 or Quick Play 516 from the Quick Start 510 HMI inputs.

Figure 5B:
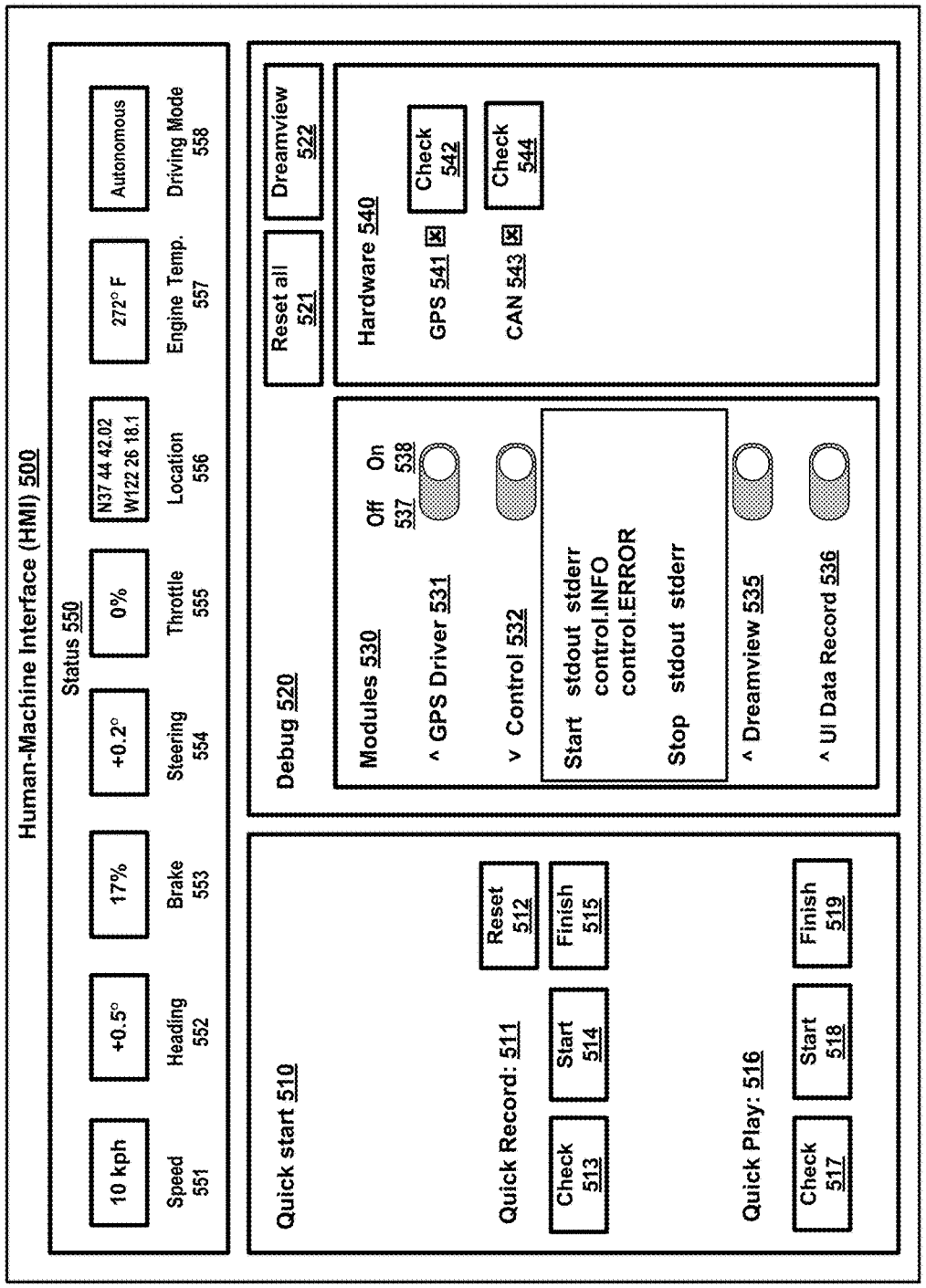
FIG. 5B illustrates an example human-machine interface for operating an ADV according to some embodiments.

FIG. 5B illustrates an HMI 500, as in FIG. 5A above, with status of "☒" shown for GPS 541 and CAN message bus 543 hardware, indicating that both the GPS 541 and CAN message bus 543 experienced one or more failures during hardware initialization and test.

Debug 520 interface also shows a button Reset All 521 that can send an ADV command to RESTful interface 420 to reset all modules 530 and hardware 540. Debug 520 Modules 530 shows log information for control 532. By clicking the "^" control next to "control 532," a drop down text box indicates log file names for "Start" and "Stop" in response to Start (e.g. Start 514 or Start 518) and Stop (e.g. Finish 515 or Finish 519). In the example shown, in response to a Start command, control 532 outputs to log files "stdout," "stderr," "control.INFO," and "control.ERROR." In response to a Stop command, control 532 writes log files to "stdout," and "stderr." Debug 520 user interface for modules 530 permits a user to edit the filenames of log files.

Figure 6:
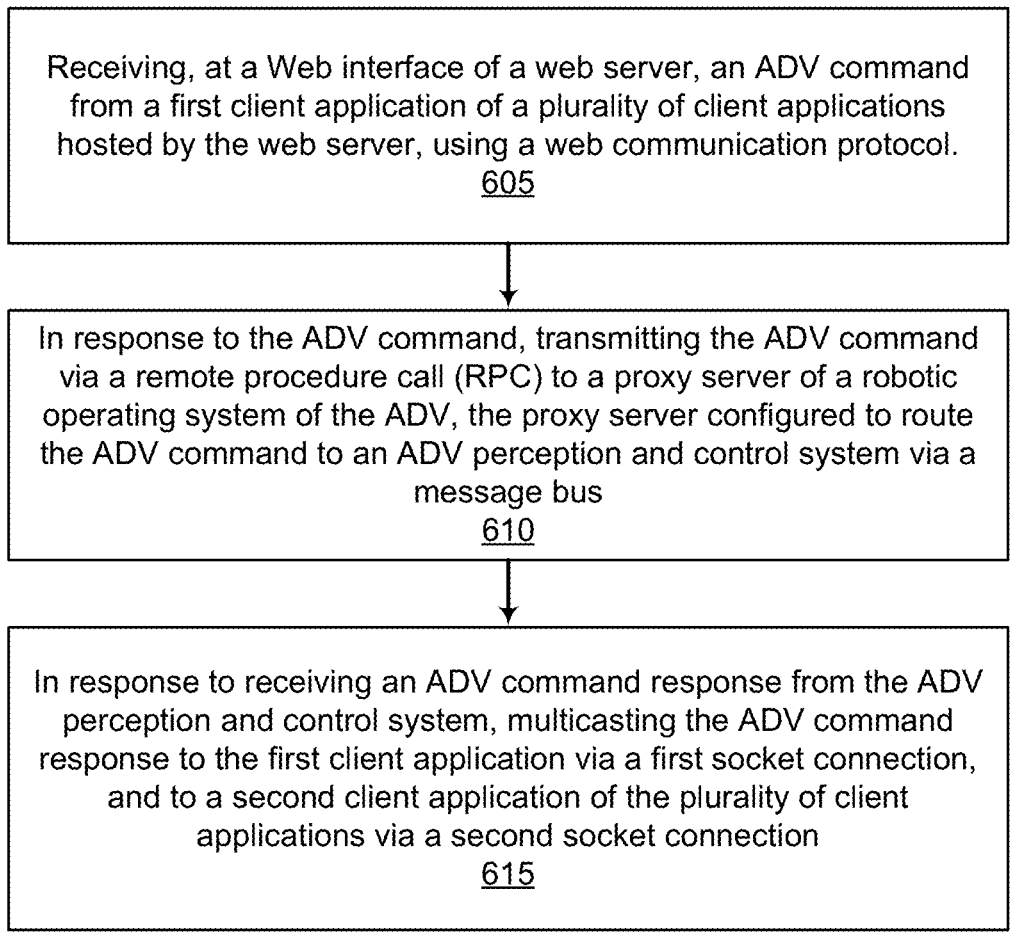
FIG. 6 illustrates a method of operating an ADV using a human-machine interface, according to some embodiments.

FIG. 6 illustrates a method 600 of operating an ADV 101 using a human-machine interface 500, according to some embodiments. Referring to FIG. 6, in operation 605, an ADV command is received at a web interface of a web server from a first client application of a plurality of client applications, using a web communication protocol. In an embodiment, the first client application comprises a human-machine interface (HMI). In an embodiment, the first client application comprises one or more web pages. In an embodiment, the first client application comprises one or more application program modules. In another embodiment, the first client application can comprise one or more web pages and one or more application program modules. In an embodiment, the web communication protocol can comprise hypertext transport protocol (HTTP), secure HTTP (HTTPS), transmission control protocol (TCP), or other web communication protocol.

In operation 610, in response to the web server receiving the ADV command from the first client application, the web server can transmit the ADV command, using a remote procedure call (RPC), to a proxy server that is a part of a back end server of the ADV. The back end server can include a message bus, such as a controller area network (CAN) message bus, and a perception and control module. Proxy server can pass the ADV command to the perception and control module via the message bus. Perception and control module can then execute the ADC command and return a status of one or more modules and subsystems of the ADV to the web server.

In operation 615, in response to the perception and control module receiving the ADV command response from the perception and control system, the Web server can multicast the ADV command response to the first client application via a first socket connection, and to a second client application of the plurality of client applications via second socket connection.

Figure 7:
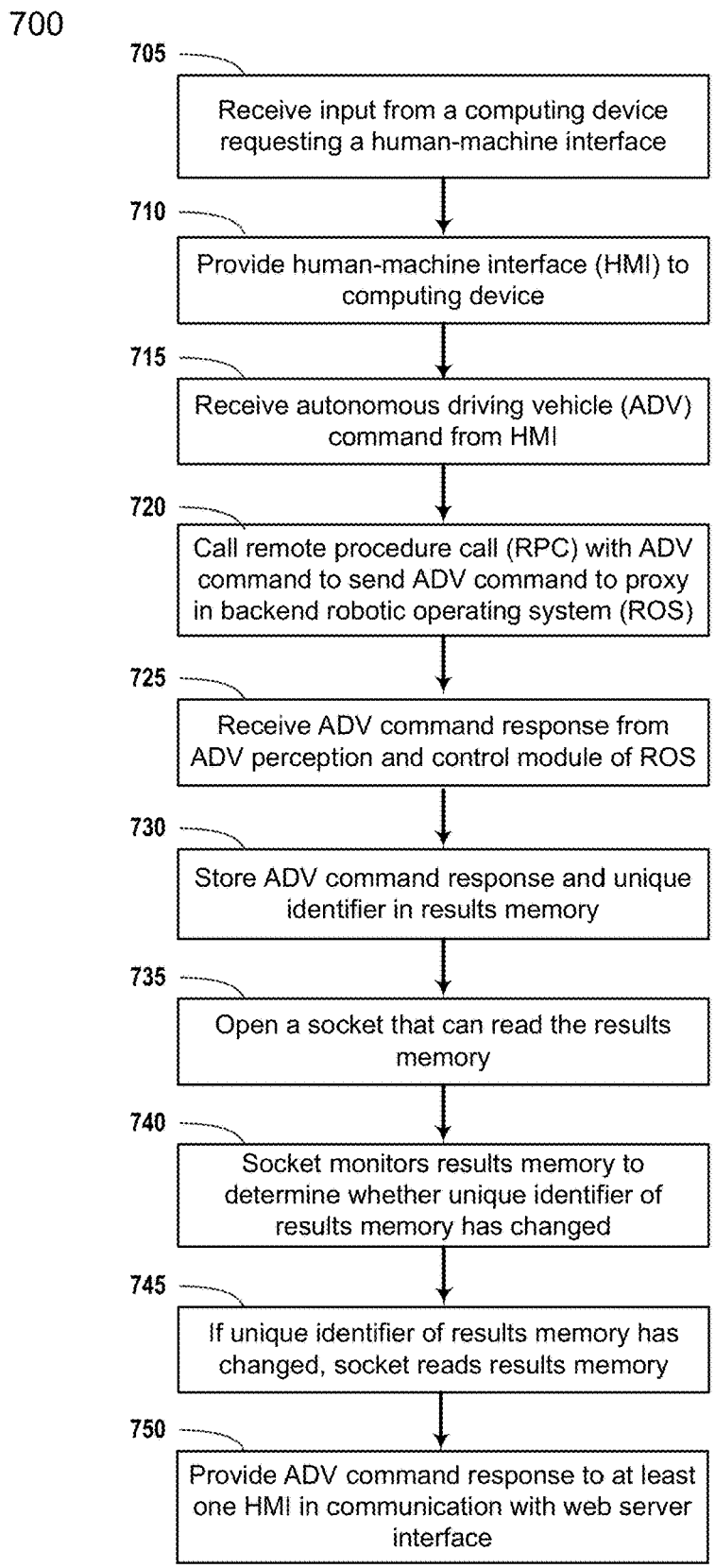
FIG. 7 illustrates a method of operating an ADV using a human-machine interface, according to some embodiments.

FIG. 7 illustrates a method 700 of operating an ADV 101 using a human-machine interface 500, according to some embodiments. Referring to FIG. 7, in operation 705, web server 405, HTML interface 415 can receive an input from a computing device requesting an HMI 500 for the ADV 101. In an embodiment, the input can be received from a web browser of the computing device.

In operation 710, HTML interface 415 can provide an HMI 500 to the requesting computing device. In an embodiment, the HMI 500 can comprise one or more web pages 430 returned to the computing device. In an embodiment, the HMI 500 can additionally, or alternatively, comprise one or more application program modules. HTML interface 415 can return the web pages 430 and/or application program modules to requesting computing device. In an embodiment, the requesting computing device can comprise a portion of an onboard computing device of the ADV. In an embodiment, the requesting computing device can be a user computing device, such as a laptop computer, tablet computer, or Smart Phone. The requesting computing can run the HMI from the web pages and/or application program modules sent to by the HTML interface 415.

In operation 715, RESTful interface 420 can receive an ADV command from the HMI 500. A command can be one or more of: start, or stop, recording of an ADV driving session; playback a recorded ADV driving session; turn on, or off, a module of the ADV; or check, and return a status, of a module of the ADV. A module of the ADV can be one or more of a global positioning system (GPS), a control system of the ADV, a control area network (CAN) communication bus of the ADV, a localization module of the ADV, or a data recording system of the ADV. In an embodiment, the ADV command can be any command button shown and described in FIGS. 5A and 5B, above.

In operation 720, RESTful interface 420 can make a remote procedure call (RPC) to send the ADV command to back end 480 proxy server 485.

In operation 725, RESTful interface 420 can receive a response to the ADV command sent to the proxy server 485 in operation 720, above. A response to the ADV command can include an indication of success or failure of the command, status of one or more modules or subsystems of the ADV, status of one or more hardware systems of the ADV, control inputs, such as steering input, brake, or throttle input, and the like.

In operation 730, RESTful interface 420 can store the response to the ADV command in results memory 440. In an embodiment, perception and control system 495 of the back end server 480 can determine a unique identifier (UID) 445 of the ADV command response and stored the UID in association with the ADV command response.

In operation 735, RESTful interface 420 can cause a socket 425 to be opened. The socket 425 can monitor the results memory 440 for changes, including UID 445, and can read the results memory.

In operation 740, socket 425 monitors the results memory to determine whether UID 445 has changed.

In operation 745, if the UID 445 has changed, then a new ADV command response and/or ADV status is available in results memory. Socket 425 reads the results memory in response to determining that UID 445 has changed.

In operation 750, socket 425 can provide the ADV command response to one or more of HMIs 500, e.g. HMI 410A and/or HMI 410B.

Figure 8:
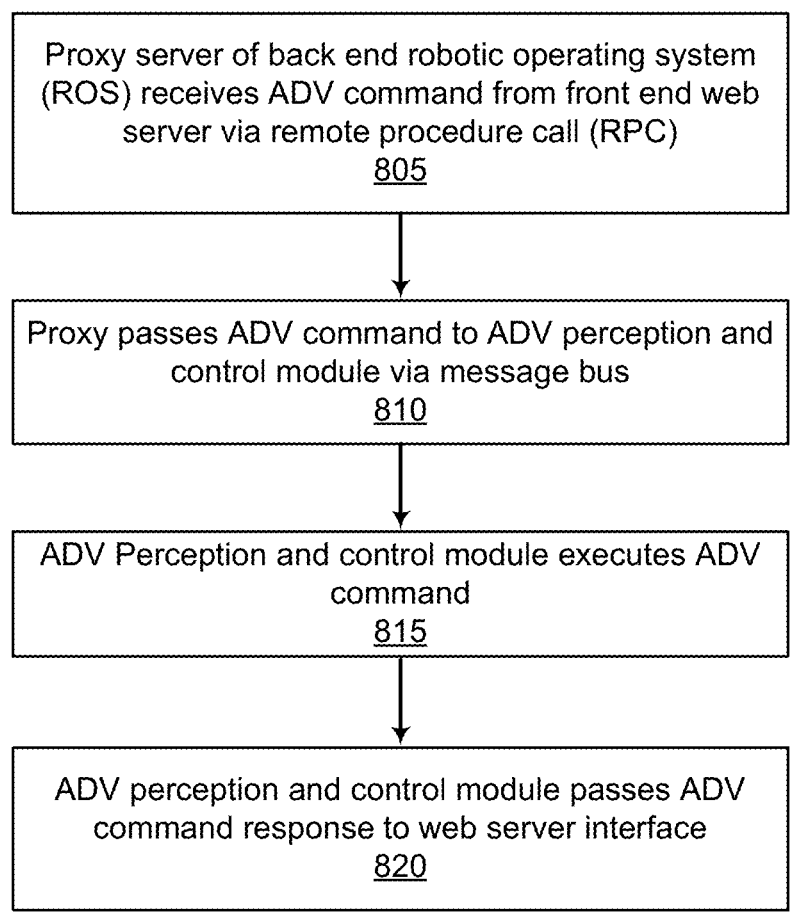
FIG. 8 illustrates a method of operating an ADV using a back end server having a robotic operating system, according to some embodiments.

FIG. 8 illustrates a method 800 of operating an ADV using a back end server 480 with a robotic operating system, according to some embodiments. Back end server 480 receives ADV commands from RESTful interface 420 via remote procedure call. The ADV commands are received by the RESTful interface 420 in response to one or more inputs received from HMI 410A and/or HMI 410B.

In operation 805, proxy server 485 of back end server 480 receives an ADV command from front end server 405 RESTful interface 420 via remote procedure call 435.

In operation 810, proxy server 485 passes the ADV command to perception and control system 495, via CAN message bus 490. In operation 815, ADV perception and control system 495 executes the ADV command.

In operation 820, ADV perception and control system 495 passes an ADV command response to RESTful interface 420. In an embodiment, perception and control system 495 calls API 450 of web server 405 to pass the ADV command response to the RESTful interface 420 of the web server 405. As described above, an ADV command response can include an indication of success or failure of the command, status of one or more modules or subsystems of the ADV, status of one or more hardware systems of the ADV, control inputs, such as steering input, brake, or throttle input, and the like.

Figure 9:
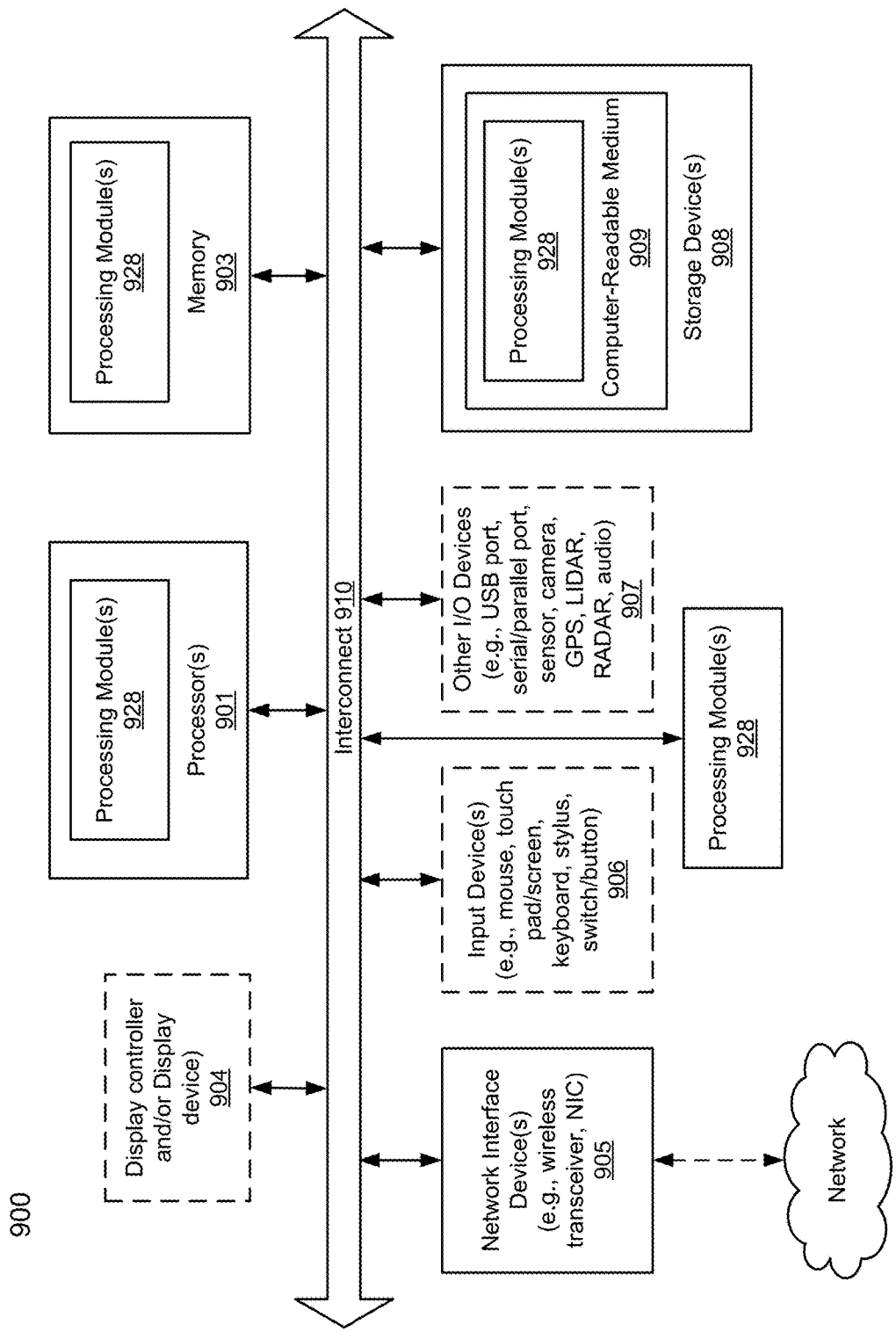
FIG. 9 is a block diagram illustrating a data processing system according to one embodiment.

FIG. 9 is a block diagram illustrating an example of a data processing system 900 which may be used with one embodiment of the invention. For example, system 900 may represent any of data processing systems described above performing any of the processes or methods described above, such as, for example, autonomous vehicle 101 systems, such as perception and planning 110, control system 111, infotainment system 114, etc., or any of servers 103-104 of FIG. 1. System 900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 900 is intended to show a high level view of many components of the computer system. However, it is to be understood that additional components may be present in certain implementations and furthermore, different arrangement of the components shown may occur in other implementations. System 900 may represent a desktop, a laptop, a tablet, a server, a mobile phone, a media player, a personal digital assistant (PDA), an embedded processing controller, a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 900 includes processor 901, memory 903, and devices 905-908 via a bus or an interconnect 910. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. In an embodiment, processor(s) 901 comprise at least one hardware processor.

Processor 901, which may be a low power multi-core processor socket such as an ultra-low voltage processor, may act as a main processing unit and central hub for communication with the various components of the system. Such processor can be implemented as a system on chip (SoC). Processor 901 is configured to execute instructions for performing the operations and steps discussed herein. System 900 may further include a graphics interface that communicates with optional graphics subsystem 904, which may include a display controller, a graphics processor, and/or a display device.

Processor 901 may communicate with memory 903, which in one embodiment can be implemented via multiple memory devices to provide for a given amount of system memory. Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 900 may further include IO devices such as devices 905-908, including network interface device(s) 905, optional input device(s) 906, and other optional IO device(s) 907. Network interface device 905 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Input/Output (I/O) devices 907 may include an audio device. An audio device may include a speaker and/or a microphone to facilitate voice-enabled functions, such as voice recognition, voice replication, digital recording, and/or telephony functions. Other I/O devices 907 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 910 via a sensor hub (not shown), while other devices such as a keyboard or thermal sensor may be controlled by an embedded controller (not shown), dependent upon the specific configuration or design of system 900. I/O devices 907 may further include a RADAR system (radio detection and ranging), a LIDAR system (light detection and ranging), a GPS system (global positioning system), cell phone subsystems that can detect and triangulate using cell towers, microphone(s), and other, audio/video recording camera(s), position, distance, time, speed, acceleration, horizontal and vertical level detectors, orientation, and directional sensors.

To provide for persistent storage of information such as data, applications, one or more operating systems and so forth, a mass storage (not shown) may also couple to processor 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 901, e.g., via a serial peripheral interface (SPI). This flash device may provide for non-volatile storage of system software, including BIOS as well as other firmware of the system.

Storage device 908 may include computer-accessible storage medium 909 (also known as a machine-readable storage medium or a computer-readable medium) on which is stored one or more sets of instructions or software (e.g., module, unit, and/or logic 928) embodying any one or more of the methodologies or functions described herein. Processing module/unit/logic 928 may represent any of the components described above, such as, for example, autonomous vehicle 101 (AV) localization module 301, perception module 302, driving decision module 303, planning module 304, control module 305, proxy module 306, and controller area network message bus 307, and one or more modules to process sensor data for driving the AV planning and control modules. Processing module(s) 928 can further implement HTML server 308A, web server interface 308B, and interprocess communication (IPC) module 308C, described above. Processing module/unit/logic 928 may also reside, completely or at least partially, within memory 903 and/or within processor 901 during execution thereof by data processing system 900, memory 903 and processor 901 also constituting machine-accessible storage media. Processing module/unit/logic 928 may further be transmitted or received over a network via network interface device 905.

Computer-readable storage medium 909 may also be used to store the some software functionalities described above persistently. While computer-readable storage medium 909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 928, components and other features described herein can be implemented as discrete hardware components or integrated in the functionality of hardware components such as ASICS, FPGAs, DSPs or similar devices. In addition, processing module/unit/logic 928 can be implemented as firmware or functional circuitry within hardware devices. Further, processing module/unit/logic 928 can be implemented in any combination hardware devices and software components. Processing logic can include, e.g. logic to record driving sessions, update HMIs, operate the ADV using one or more HMIs as described above with reference to FIG. 7, and to implement and ADV back end as described above with reference to FIG. 8. Processing logic can further include, e.g. logic to determine a location of an ADV with respect to the HD map feature space, update HMIs on ADVs by downloading 103B one or more web pages and/or program application modules to ADVs, and logic to analyze 103C ADV driving session records using machine learning engine 103A.

Note that while system 900 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of operating an autonomous driving vehicle (ADV), the method comprising:
    receiving, at a Web interface of a web server, an ADV command from a first client application, the ADV command being received using a Web communication protocol, wherein the first client application is one of a plurality of client applications hosted by the Web server;
    in response to the ADV command, transmitting the ADV command via a remote procedure call (RPC) to a proxy server of a robotic operating system of the ADV, the proxy server configured to route the ADV command to an ADV perception and control system via a Controller Area Network (CAN) message bus; and
    in response to receiving an ADV command response from the ADV perception and control system, wherein the ADV command response is stored in a results memory of the web server, multicasting the ADV command response to the first client application via a first socket connection and to a second client application of the plurality of client applications via a second socket connection.

2. The method of claim 1, further comprising:
    storing the ADV command response in the results memory of the web server, in association with a unique identifier of the ADV command response; and
    opening a socket to read from the results memory at least a portion of the ADV command response that includes the unique identifier in response to a change in the results, wherein the socket retrieves the ADV command response from the results memory and transmit the ADV command to the first and second client applications via the first and second socket connections respectively.

3. The method of claim 2, wherein the unique identifier of the ADV response comprises one or more of: a hash of the ADV command response, a checksum of the ADV command response, or a unique identifier associated with the ADV command response generated by the ADV perception and control module.

4. The method of claim 1, wherein the ADV command comprises one of:
    start, or stop, recording of an ADV driving session;
    playback a recorded ADV driving session;
    turn on, or off, a module of the ADV; or
    check, and return a status of, a module of the ADV, wherein a module of the ADV comprises one or more of: a global positioning system (GPS), a control system of the ADV, a control area network (CAN) communication bus of the ADV, a localization module of the ADV, or a data recording system of the ADV.

5. The method of claim 1, wherein the Web communication protocol comprises a representational state transfer (REST) protocol.

6. The method of claim 1, wherein the ADV command response is received by the web server via an application programming interface (API) of the web server called by the ADV perception and control system of the robotic operating system.

7. The method of claim 1, further comprising:
    reading, by the socket, the unique identifier of the ADV command response; and
    determining that the unique identifier associated with the ADV command response has changed.

8. A non-transitory machine-readable medium having executable instructions stored therein, which when executed by a processor, cause the processor to perform operations for operating an autonomous driving vehicle (ADV), the operations comprising:
    receiving, at a Web interface of a web server, an ADV command from a first client application, the ADV command being received using a Web communication protocol, wherein the first client application is one of a plurality of client applications hosted by the Web server;
    in response to the ADV command, transmitting the ADV command via a remote procedure call (RPC) to a proxy server of a robotic operating system of the ADV, the proxy server configured to route the ADV command to an ADV perception and control system via a Controller Area Network (CAN) message bus; and
    in response to receiving an ADV command response from the ADV perception and control system, wherein the ADV command response is stored in a results memory of the web server, multicasting the ADV command response to the first client application via a first socket connection and to a second client application of the plurality of client applications via a second socket connection.

9. The medium of claim 8, wherein the operations further comprise:
    storing the ADV command response in the results memory of the web server, in association with a unique identifier of the ADV command response; and
    opening a socket to read from the results memory at least a portion of the ADV command response that includes the unique identifier in response to a change in the results, wherein the socket retrieves the ADV command response from the results memory and transmit the ADV command to the first and second client applications via the first and second socket connections respectively.

10. The medium of claim 9, wherein the unique identifier of the ADV response comprises one or more of: a hash of the ADV command response, a checksum of the ADV command response, or a unique identifier associated with the ADV command response generated by the ADV perception and control module.

11. The medium of claim 8, wherein the ADV command comprises one of:
    start, or stop, recording of an ADV driving session;
    playback a recorded ADV driving session;
    turn on, or off, a module of the ADV; or
    check, and return a status of, a module of the ADV, wherein a module of the ADV comprises one or more of: a global positioning system (GPS), a control system of the ADV, a control area network (CAN) communication bus of the ADV, a localization module of the ADV, or a data recording system of the ADV.

12. The medium of claim 8, wherein the Web communication protocol comprises a representational state transfer (REST) protocol.

13. The medium of claim 8, wherein the ADV command response is received by the web server via an application programming interface (API) of the web server called by the ADV perception and control system of the robotic operating system.

14. The medium of claim 8, wherein the operations further comprise:
reading, by the socket, the unique identifier of the ADV command response; and
determining that the unique identifier associated with the ADV command response has changed.

15. A web server comprising:
a processor; and
a memory coupled to the processor to store instructions, which when executed by the processor, cause the processor to perform operations for operating an autonomous driving vehicle (ADV), the operations comprising:
receiving, at a Web interface of a web server, an ADV command from a first client application, the ADV command being received using a Web communication protocol, wherein the first client application is one of a plurality of client applications hosted by the Web server,
in response to the ADV command, transmitting the ADV command via a remote procedure call (RPC) to a proxy server of a robotic operating system of the ADV, the proxy server configured to route the ADV command to an ADV perception and control system via a Controller Area Network (CAN) message bus, and
in response to receiving an ADV command response from the ADV perception and control system, wherein the ADV command response is stored in a results memory of the web server, multicasting the ADV command response to the first client application via a first socket connection and to a second client application of the plurality of client applications via a second socket connection.

16. The web server of claim 15, wherein the operations further comprise:
storing the ADV command response in the results memory of the web server, in association with a unique identifier of the ADV command response; and
opening a socket to read from the results memory at least a portion of the ADV command response that includes the unique identifier in response to a change in the results, wherein the socket retrieves the ADV command response from the results memory and transmit the ADV command to the first and second client applications via the first and second socket connections respectively.

17. The web server of claim 16, wherein the unique identifier of the ADV response comprises one or more of: a hash of the ADV command response, a checksum of the ADV command response, or a unique identifier associated with the ADV command response generated by the ADV perception and control module.

18. The web server of claim 15, wherein the ADV command comprises one of:
start, or stop, recording of an ADV driving session;
playback a recorded ADV driving session;
turn on, or off, a module of the ADV; or
check, and return a status of, a module of the ADV, wherein a module of the ADV comprises one or more of: a global positioning system (GPS), a control system of the ADV, a control area network (CAN) communication bus of the ADV, a localization module of the ADV, or a data recording system of the ADV.

19. The web server of claim 15, wherein the Web communication protocol comprises a representational state transfer (REST) protocol.

20. The web server of claim 15, wherein the ADV command response is received by the web server via an application programming interface (API) of the web server called by the ADV perception and control system of the robotic operating system.

21. The web server of claim 15, wherein the socket reads the unique identifier of the ADV command response and determine that the unique identifier associated with the ADV command response has changed.

* * * * *